D. COLE AND J. BERGMAN.
METHOD AND PLANT FOR STORING AND AVERAGING MATERIALS.
APPLICATION FILED DEC. 3, 1919.
1,389,184.
Patented Aug. 30, 1921.
5 SHEETS—SHEET 1.
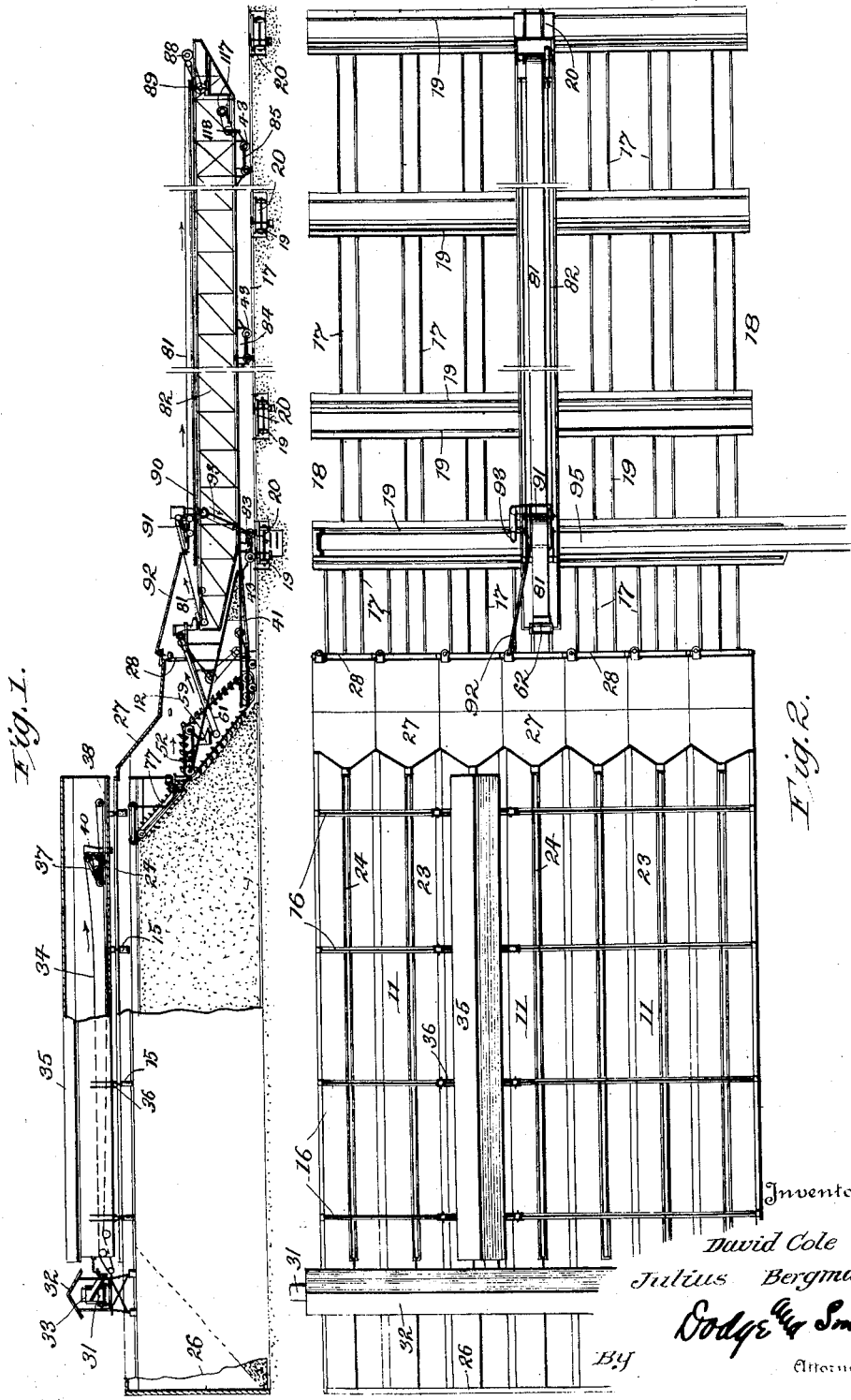

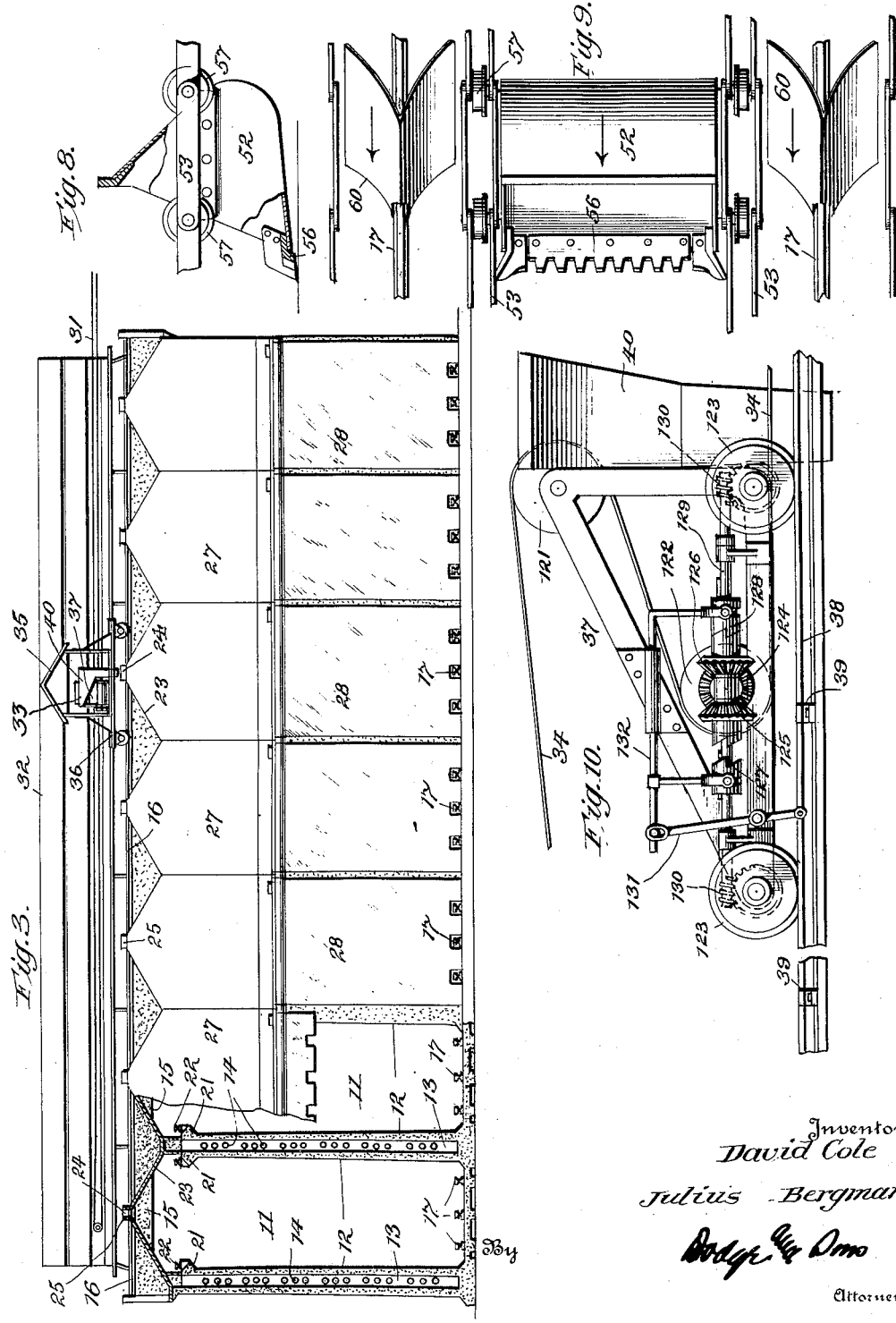

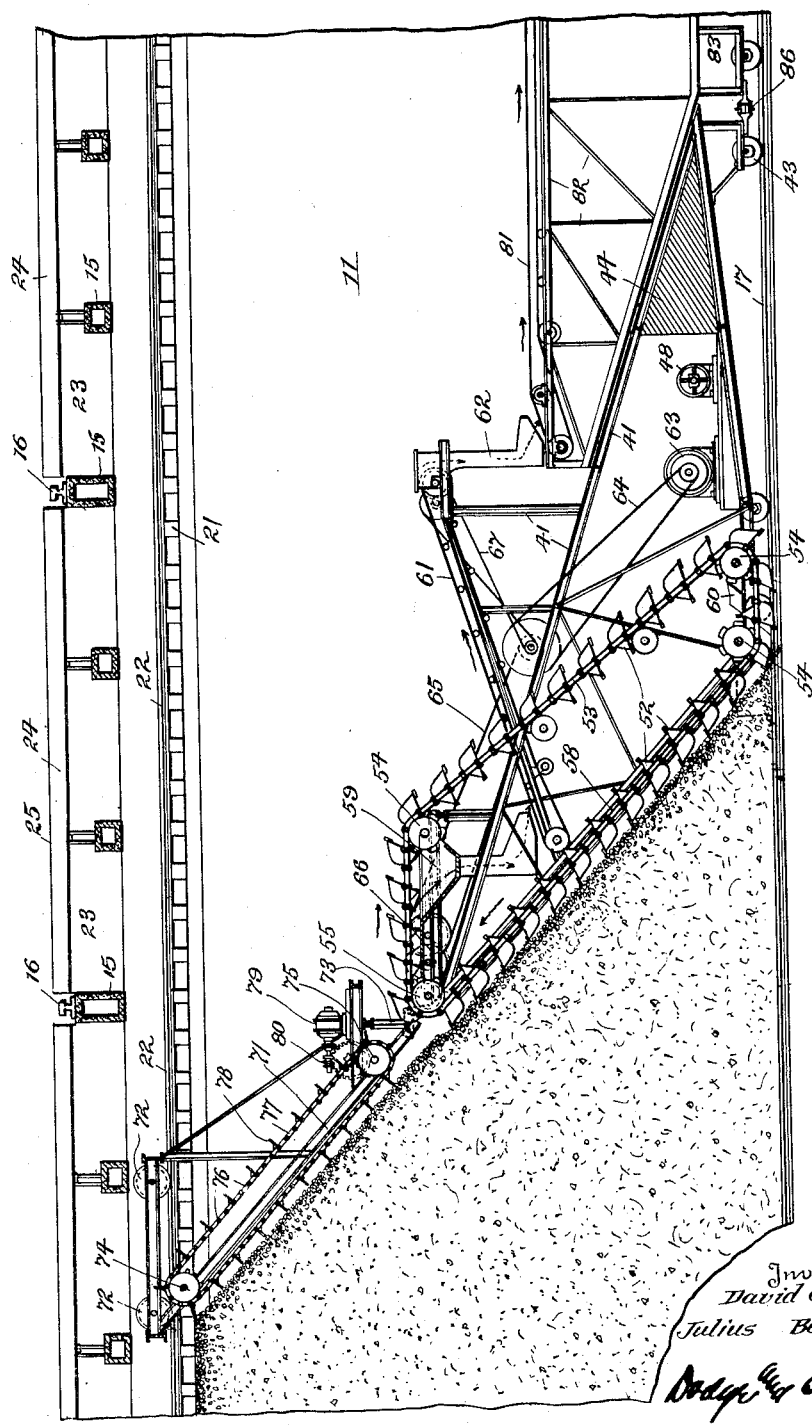

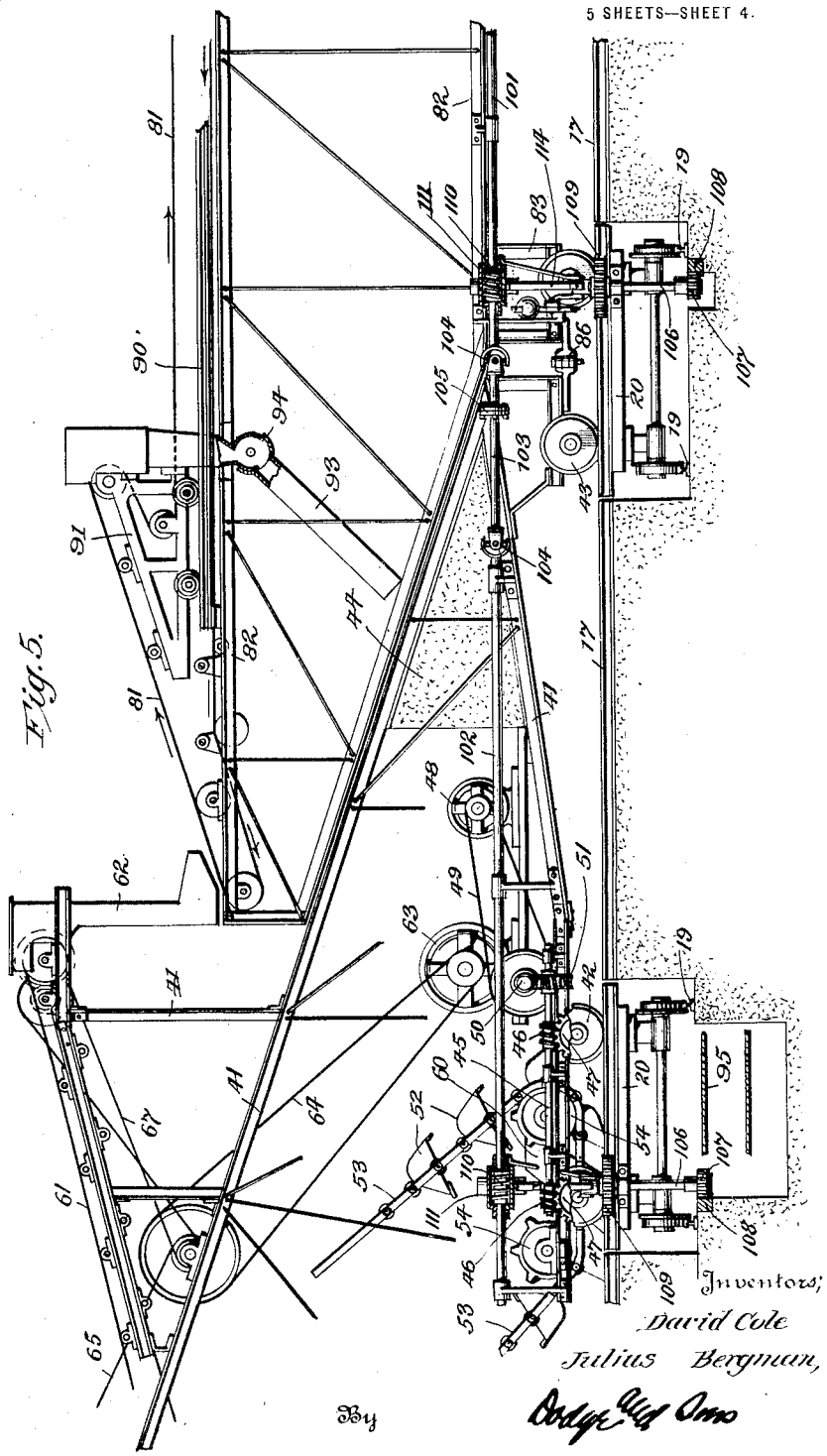

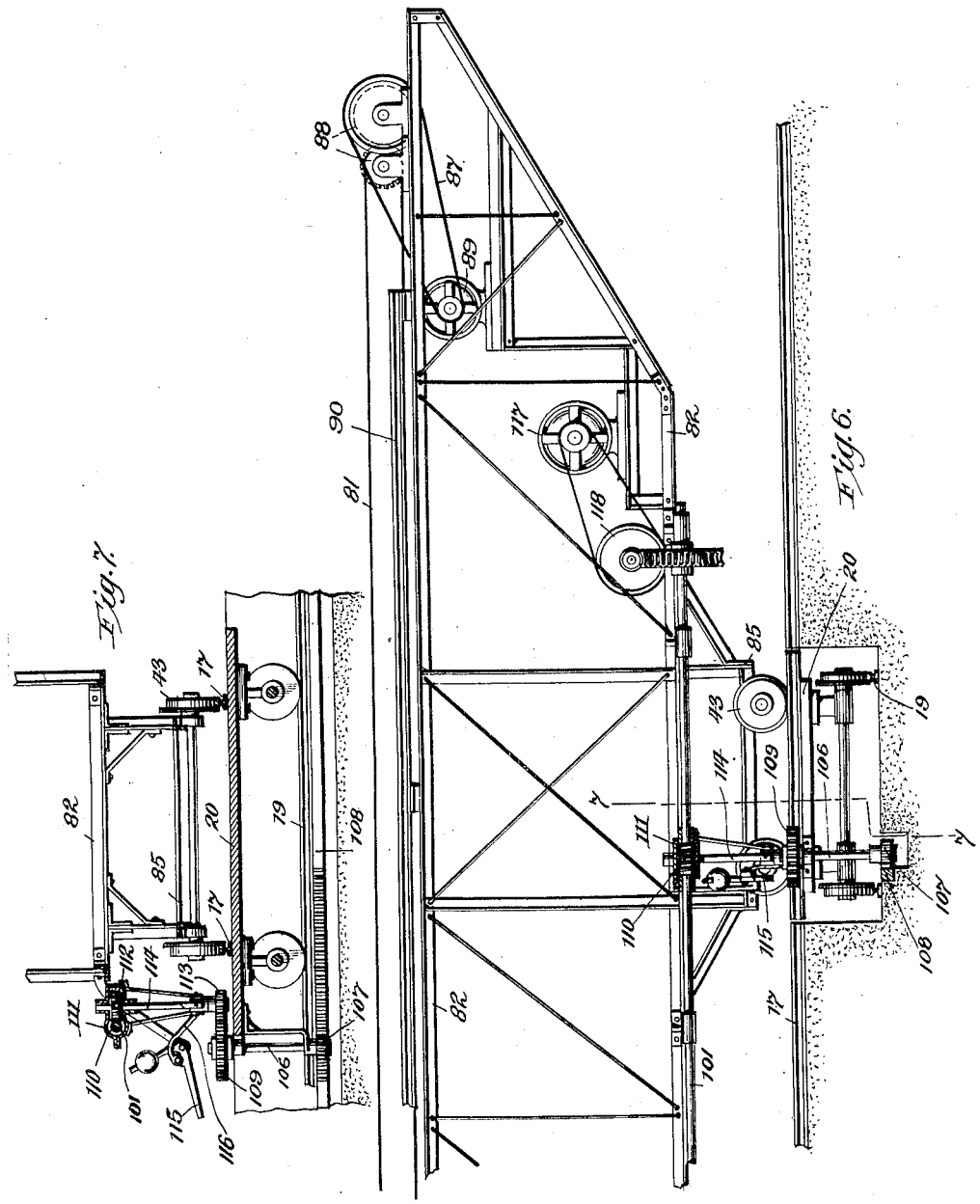

UNITED STATES PATENT OFFICE.

DAVID COLE AND JULIUS BERGMAN, OF EL PASO, TEXAS.

METHOD AND PLANT FOR STORING AND AVERAGING MATERIALS.

1,389,184.  Specification of Letters Patent.  Patented Aug. 30, 1921.

Application filed December 3, 1919. Serial No. 342,299.

*To all whom it may concern:*

Be it known that we, DAVID COLE and JULIUS BERGMAN, citizens of the United States, residing at El Paso, in the county of El Paso and State of Texas, have invented certain new and useful Improvements in Methods and Plants for Storing and Averaging Materials, of which the following is a specification.

This invention relates to methods of and plants for storing and averaging solid materials in bulk, and is particularly adapted to use in mining operations.

The method is made possible by certain features of arrangement of the apparatus. Heretofore plants to receive ore varying in quantity from time to time, and to feed to the smelter or other metallurgical apparatus a substantially uniform mixture approximating the average output of the mine over an extended period, have been known. They were not however adapted to the storage of finely crushed materials or to use in cold climates because the nature of the reclaiming apparatus necessitated the use of open piles.

The present invention is made practically possible by a new method of reclaiming and apparatus therefor. This permits the use of laterally confined piles and leads to radical improvements in various directions which extend the field of use to finely crushed materials and to cold climates and which result in substantial economies in installation and operation.

The invention makes use of some principles set forth in the patent to Messiter No. 677,677, July 2, 1901. The Messiter system is not applicable to finely divided ores, because the exposed nature of the storage beds leads to drifting of the fines in the wind, with serious losses of ore and the burying of all inactive conveyers. Similarly the Messiter system is available for use only in warm climates because freezing of the beds necessarily puts such systems out of action. There is a demand for a storage system of this general nature available for use in northern climates.

The limitations imposed on the Messiter system are, as already suggested, primarily due to the manner characteristic of them of reclaiming ore from open storage piles. This method limits the height and volume of the pile by the available width of pile and the angle of repose of material. As a result, such installations have always covered large ground area in proportion to their storage capacity so that housing of the storage space has been an economic impossibility. The conveyer system, moreover, was elaborate, involving extensive duplication of conveyers.

The present invention is founded on but not confined to, a new apparatus for reclaiming the stored material from a high narrow bin. This new arrangement does not limit the height of the pile; does not require its sides to be exposed, and does not require any interval between piles. This therefore permits the use of bins of any reasonable height and permits the bins to be arranged side by side, upon a greatly reduced ground area. Complete housing of the bins becomes an economic possibility so that finely divided ore may be stored. Also the stored material forms in effect a single pile subdivided by parallel bin walls. Heat losses from the stored material by radiation to the surrounding air are therefore minimized, and it becomes economically possible to prevent freezing by the use of artificial heat, even in severe northern climates.

The compact and self-sustaining nature of the bin structures, permits important improvements in the bedding conveyer system and in the reclaiming conveyer system, and in their methods of use. Heretofore a complete bedding conveyer and a complete reclaiming conveyer was necessarily provided for each pile, though only one of each was in action at a given time.

As a result of the improved principle of operation of the reclaimer mechanism characteristic of this invention, the reclaimer conveyer is not duplicated but may be transferred to act on any pile. Similarly the support offered by the bin structure is availed of to permit transfer of a single bedding conveyer to any chosen bin. This avoidance of duplication, together with the greatly reduced length of all conveyers, due to the reduced ground area of a plant of given capacity leads to great economies.

As compared with prior systems, and basing figures on a comparison of 100,000 ton plants, the present invention reduces ground area to 17½% of that formerly required; reduces total length of conveyers to 5½% of that formerly required, reduces cost to approximately 40% of the cost of prior systems, and extends the field of practical use to finely divided ores and cold climates.

Before proceeding to a detailed description, the general scheme will be outlined.

*The bins.*—These comprise a cellular reinforced concrete structure, consisting of parallel walls tied together at the top with concrete beams and having intervening spaces forming long narrow bins or stalls. The cellular construction permits heating pipes to be run in the walls. Each bin or stall is roofed over except for a central longitudinal slot through which the bedding conveyer discharges into the bin. The ends of each bin are closed, one end permanently and the other by rolling metallic curtains. In the bottom of each bin is a track which runs out into a yard at the ends of the bins. The various tracks are parallel in the yard and transfer trucks provide for transfer from one track to another.

*The bedding conveyer.*—This conveyer preferably is of the belt type and extends parallel to the bins above the roofs thereof. It is mounted on wheels which run on tracks extending across the tops of the bins, and hence may be moved to position to discharge through the slot in the roof of any bin, into that bin. It is equipped with a traveling tripper of conventional type, which moves slowly back and forth the length of the bedding conveyer, while the latter is in action so that the bed is built up gradually throughout its entire length. The bedding conveyer is fed by a feeding conveyer which extends transversely across the tops of the bins at one end thereof. The feeding conveyer discharges to the bedding conveyer by means of a tripper which runs on a track under the feeding conveyer. This tripper is preferably connected to the frame of the bedding conveyer to move with the latter and hence always remain in definite feeding relation thereto. They may however be unconnected and be moved individually to proper relative position each time a different bin is to be bedded.

*Reclaiming mechanism.*—This includes a bucket excavator, called the "reclaiming head" and a power driven rake. The rake runs on tracks near the top of the bin structure and one is provided for and remains in each bin. The reclaiming head runs on the tracks in the bottom of the bins and may be moved from one bin to another by means of the transfer trucks in the yard already mentioned. In action, the reclaimer head is self-propelling and is connected to the rake to propel the latter. Together, they move slowly through the bin, the rake drawing down the upper part of the bed and the reclaimer excavating the lower part of the bed as well as the material raked down to it over the whole width of the bin.

*The reclaimer conveyer.*—All the excavated material is discharged by the reclaimer head into the reclaimer conveyer.

This is a long wheeled structure running on the track behind the reclaimer head and drawn forward by the reclaimer head as this advances into a bin. At its top it carries a belt conveyer which carries the material back out of the bin. The reclaimer conveyer is approximately as long as the bin and discharges by means of a tripper to another conveyer running to the smelter. This tripper is mounted on a track carried by the frame of the reclaimer conveyer, and is anchored at the desired discharge point. The frame of the reclaimer conveyer thus moves into the bin under a substantially immovable tripper, so that though the conveyer and frame advance into the bin the discharge point of the latter remains constant.

*Transfer mechanism.*—The reclaimer head and reclaimer conveyer are transferred from track to track while connected together as a unit. They are separable primarily to permit the substitution of a spare reclaimer head in case of breakdown. The transfer trucks are driven from a line shaft which extends the entire length of the conveyer frame and reclaimer head. The trucks are equipped with pinions meshing with rack rails along the transfer tracks. The pinions are driven by releasable driving connections from the line shaft. These connections are out of action except during the transferring operation.

In the drawings we illustrate a plant embodying the features of our invention. The details of certain standard apparatus, such as, means for transmitting current to the motors, controllers, details of traveling trippers and so forth have been omitted to avoid confusion. In general the showing is as nearly diagrammatic as the special nature of some of the mechanism permits, the present application being directed to the more general aspects of the subject. The use of standard accessory apparatus is contemplated.

In the drawings:—

Figure 1 is a side elevation partially diagrammatic of the bins, bedding conveyer, and reclaimer conveyer, a portion of the bin wall being broken away to show the reclaimer head and rake.

Fig. 2 is a general plan view, partly diagrammatic, of the bins and transfer yard showing the bedding conveyer and reclaimer conveyer.

Fig. 3 is an end elevation of the bins showing the rolling doors which close the entrance to the bins. The bedding conveyer is shown in end elevation in position to discharge into a bin.

Fig. 4 is a vertical longitudinal section through a bin showing the reclaimer head and rake connected together in their operative positions, and showing the forward end of the reclaimer conveyer. The side frames of the reclaimer head and rake are broken away, and the propelling mechanism of the reclaimer head is omitted.

Fig. 5 is a fragmentary side elevation of the rear end of the reclaimer head and the front end of the reclaimer conveyer, showing the propelling mechanism for the reclaimer head, and also showing the means for driving the transfer trucks in unison from a line shaft on the reclaimer head and reclaimer conveyer.

Fig. 6 is a fragmentary view of the rear end of the reclaimer conveyer showing the motor for driving the conveying belt, and showing the drive connections for the rear transfer truck.

Fig. 7 is a section on the line 7—7 of Fig. 6.

Fig. 8 is a side elevation of a bucket used in the reclaimer head.

Fig. 9 is a plan view of a bucket showing its relation to the spreaders or plows used at the base of the reclaimer head between adjacent series of buckets; and Fig. 10 is a schematic elevation of a traveling and reversing tripper such as is used on the bedding conveyer.

*Bin structure.*—The bins 11 are formed by a plurality of parallel vertical walls 12 preferably formed of reinforced concrete. These walls may be of cellular or hollow construction, the cells 13 offering space to house heating pipes or other heat radiating surface 14 by which freezing in severe winter weather may be prevented. The several walls 12 are tied together at the top by transverse girders, 15, also preferably of concrete and certain of these are extended upward to carry tracks 16 on which the bedding conveyer moves from one bin to another.

On the floors of the bin, which also are of concrete are track rails 17, three being shown in each bin. The reclaimer head runs on all three rails and the reclaimer conveyer runs on two at the side, since the conveyer is narrower than the head. The rails 17 run out into the yard 18. This yard is equipped with four transfer tracks 19 on each of which is a transfer truck 20, which serve to transfer the reclaimer head and reclaimer conveyer from one set of tracks 17 to another so that they may enter any chosen bin. Mounted on brackets 21 on the walls of each bin near the top thereof are rails 22 on which the rake structure is guided.

A gable roof 23 is built over each bin and extends from wall to wall partly above girders 15 and below track 16. The peak of each gable is open to furnish a long narrow slot 24 through which the bedding conveyer discharges into the bin. There may be upward extensions 25 at the sides of the slot to form a receiving trough for the discharge spout of the bedding conveyer. This will prevent drifting of fines by the wind. The extensions 25 are necessarily interrupted at the track rails 16.

The rear end of the bins are closed by a curtain wall 26. The front ends are closed by an inclined roof 27 which extends down far enough to leave a clear entrance for the reclaimer head. Below this point each bin is closed by a rolling steel door 28 or the equivalent.

From the above description and the drawings it will be seen that when the bins are full or when any substantial proportion of them is full the ore forms a unitary mass or pile from which heat will be radiated very slowly to the surrounding atmosphere. By causing the bedding operation to follow the reclaiming operation in sequence from bin to bin it is possible to insure the maintenance of not to exceed two large masses of ore, each mass consisting of the contents of one or more adjacent bins. This feature is favorable to the storage of ore in cold climates and greatly extends the utility of storage plants of this nature.

*The bedding conveyer.*—Ore arrives from the mine, the crusher or similar source by means of a conveyer 31, preferably a belt conveyer. This is inclosed in a house 32 built on top of the bin structure and extending transversely of the bins, preferably near the closed end, *i. e.*, that remote from the yard 18. The conveyer 31 has a tripper 33 running on rails in the house 32 beneath the conveyer so as to be capable of acting at any chosen point in the length of conveyer 31 to discharge material from that conveyer. Such trippers are standard articles of commerce familiar to those skilled in the art so that a detailed description is unnecessary.

The tripper 33 discharges to the bedding conveyer 34 which is inclosed in a house 35 and is preferably a belt conveyer. The house 35 has wheeled trucks 36 which run on the tracks 16 already described, such tracks being substantially parallel to the conveyer 31. The house 35 thus may be moved into position over any bin 11 and we preferably connect tripper 33 to house 35 as shown so that the two move together, thus preserving a constant relation between tripper 33 and conveyer 34 so that conveyer 31 always discharges to conveyer 34. Such connection is, however, not necessary as they may be moved individually into proper coöperative positions.

The discharge from conveyer 34 is by means of a reversible traveling tripper 37 (see Figs. 1 and 10). This travels on a track 38 in house 35 and moves back and forth along conveyer 34 giving the conveyer a progressively changing point of discharge. The points of reversal are fixed by setting the stops 39. Such trippers are standard articles of equipment but to facilitate a comprehension of the invention one type of such trippers is indicated in diagram in Fig. 10. In this figure 121 is the top conveyer belt roll, 122 the lower conveyer belt roll and 123 the track wheels. The wheels 123 are driven by a reversible train from roll 122 consisting of miter gears 124, 125 and 126, reversing clutches 127 and 128, shaft 129 and worm reduction gears 130. Gears 125 and 126 are loose on shaft 129 and clutches 127 and 128 are splined thereon. A rock lever 131 collides with stops 39 as the tripper reaches the limits of its travel and through tripper fork 132 shifts clutches 127 and 128 to disengage the engaged one and then engage the disengaged one.

The discharge spout 40 of the tripper extends down between the extensions 25 at the sides of the slots 24.

When the conveyer is in operation the tripper 37 moves slowly back and forth discharging over the entire length of the bin through slot 24. In this manner the bed is gradually built up in horizontal layers. Under special conditions the tripper 37 may have its drive gear disconnected to cause the tripper to remain at rest.

We contemplate the use of any conveyer mechanism which will give the distributing discharge above described, but prefer the mechanism described as it can be purchased and used practically in commercial forms.

*The reclaimer mechanism.*—This consists of three closely related coacting mechanisms, the reclaimer head, which is a bucket excavator of special type, the rake which draws material down to the reclaimer head from the higher portions of the bed, and the reclaimer conveyer which is a continuous conveyer mounted on a wheeled structure which travels behind the reclaimer head as the latter advances into the bin, and carries the spoil back out of the bin.

The reclaimer head is carried by a frame 41 which has flanged wheels 42 and 43 running on the tracks 17. The forward head of the frame over-hangs in order to bring the active line of buckets against the breast of the bed. Its over-hang therefore approximates the angle of repose of the material in the bins. To give stability a counterweight 44 preferably of concrete is mounted at the rear end of frame 41.

The forward wheels 42 are propelling wheels and are driven from a shaft 45 by the worms 46 (see Fig. 5) meshing with worm wheels 47 on the axles of wheels 42. The shaft 45 is driven by motor 48 through a reduction gear consisting of sprocket chain 49, worm 50 and worm wheel 51. The motor 48 would in practice be equipped with variable speed control, but as such apparatus is standard it is not illustrated in the drawings.

The excavator consists of a plurality of series of buckets 52 carried on sprocket chain 53 running around guide sprockets 54 and drive sprocket 55. In the case illustrated four series of buckets are used. The form of the chain and buckets is shown in Figs. 8 and 9. Each bucket 52 has a renewable toothed mouth 56 and the chain 53 has rollers 57 between successive links. The rollers 57 run on a guide track 58 in the working stretch of the excavator, and hold the buckets down to their work.

Starting from the lower rear guide pulley each bucket moves forward along the floor of the bin scraping up the toe of the pile or bed. It then moves up the breast of the pile gradually filling as it goes, and then swings over the drive sprocket 55 and discharges into a hopper 59 common to all the series of buckets. Thence it moves over guide sprockets back to its starting point.

In order to clean up the toe of the pile, including the space between the series of buckets, spreaders or plows 60 are mounted on the frame 41 between the series of buckets, at a point where these are moving forward on the floor of the bin.

The hopper 59 discharges to a belt conveyer 61 also mounted on the frame 41 and this conveyer discharges the material through a spout 62 to the reclaimer conveyer. The conveyer 61 runs between the two series of reclaimer buckets 52, and running at relatively high speed a single narrow belt can handle the material excavated by all the slower moving buckets.

A motor 63 with appropriate speed control (not shown) drives the buckets through sprocket chains 64 and 65 and reduction gearing 66. A third sprocket chain 67 taking power from chain 64 through the sprockets and shaft between chains 64 and 65 drives the conveyer 61. In this way the speeds of the buckets and of the conveyer 61 are always properly coördinated.

The rake structure operates as an extension of the reclaimer head but unlike the reclaimer head is supported by the bin walls and can not be moved from one bin to another. This arrangement is adapted to avoid making the reclaimer head unduly high and cumbersome, and is feasible because the rake structure is simple and inexpensive so that its duplication for each bin is less expensive than the transfer mechanism to move it from bin to bin would be.

Each rake structure is carried on a frame 71 extending the width of the bin and having wheels 72 running on the tracks 22 on the side walls of the bin. The lower end of the frame 71 has a bracket 73 which is shackled to the frame 41 of the reclaimer head. Thus the rake structure moves with, and is propelled by the reclaimer head.

Shafts 74 and 75 extend from side to side of the frame and each carries a plurality of sprockets 76. A plurality of endless chains 77 run over these sprockets, and each carries harrow teeth 78 spaced at short intervals. The frame 71 is so formed that the active runs of chains 77 approximate the angle of repose of the material. A small motor 79 drives shaft 75 by a worm reduction gear 80 causing the chains, with their harrow teeth, to rake material from the upper portion of the bed down to the field of action of the reclaimer buckets.

When the reclaimer head is to be transferred from one bin to another the rake structure is drawn to the open or entrance end of the bin and is then disconnected from the reclaimer head. The bins are so proportioned that this leaves the rake out of the path of material falling from the bedding conveyer.

The reclaimer conveyer 81 is carried on a long steel frame 82 which runs on a front truck 83, a middle truck 84 and a rear truck 85 on the rails 17. As indicated in Fig. 2 frame 82 runs on the middle and one side rail, but any arrangement that would permit it to trail behind the reclaimer head and into the bins is practicable. It is connected to frame 41 of the reclaimer head by a coupling 86.

Conveyer 81 is preferably of the belt type and is driven through a sprocket chain 87 and reduction gears 88 by motor 89. The conveyer is mounted on top of frame 82 and on this frame and beneath the conveyer is a track 90 on which a discharge tripper 91 is mounted so as to be capable of moving along the frame 82. This tripper is of usual type. It has no propelling means. A boom 92 is provided to connect the frame of tripper 91 to the wall 12 at the opening into the bin. Thus the tripper is held in a fixed position while the frame 82 moves into the bins drawn by the reclaimer head. This gives to the conveyer 81 a constant discharge point.

The tripper 91 has a discharge spout 93 which is hinged at 94 to allow the end of the spout to be swung in a vertical plane forward and back. This spout discharges to a conveyer 95 which carries the material to the furnaces or any other point of use. The purpose of hinging the spout 93 is to permit the tripper 91 to be held by boom in two positions, one in which the tripper is between the conveyer 95 and the bins, and the other in which it is on the side of conveyer 95 away from the bins. The latter position is used at the beginning of the reclaiming operation, and the other after the frame 82 has advanced far enough to permit it. This range of movement of tripper 91 allows frame 82 to be made shorter than would otherwise be the case.

*The transfer mechanism.*—The transfer trucks 20 are four in number. One takes the driving wheels 42 of the reclaimer head; another the rear wheels 43 of the reclaimer head and the front truck 83 of the frame 82; and the third and fourth the middle truck 84 and rear truck 85 respectively. (See particularly Figs. 2, 5 and 7).

The four transfer trucks 20 are propelled in unison by gearing from a line shaft 101 which runs along the frame 82 of the reclaimer conveyer and a similar line shaft 102 which is mounted on the frame 41 of the reclaimer head. These two shafts are connected by a short connecting shaft 103 through universal joints 104. The shaft 103 is in two parts, releasably connected by a bolted coupling 105.

Each transfer truck 20 carries a vertical shaft 106 which has at its lower end a pinion 107 meshing with a rack rail 108 parallel to the transfer tracks 19. At the upper end of shaft 106 is another gear 109. Worms 110 are fixed on the shafts 101 and 102 and housings 111 are swiveled on the shaft 101 or 102, as the case may be, at each worm 110 so as to be capable of a limited swinging movement around the shaft. Each housing 111 carries a worm wheel 112 meshing with worm 110 and a spur gear 113 (see Fig. 7) both fast on shaft 114. The worms 110 are so spaced and the parts so proportioned that when the reclaimer head and conveyer are on the transfer trucks the housings 111 may be swung to cause gears 113 to mesh with respective gears 109. Counter-weighted levers 115 and connecting links 116 serve as means for shifting housings 111 to mesh and unmesh gears 113 with gears 109. They are meshed only during the transferring operation. The shafts 101 and 102 are driven by a motor 117 through a worm reduction gear 118. Any equivalent drive might be substituted. The arrangement described insures uniform movement of all the transfer trucks so that the alinement of the reclaimer head and conveyer with each track in the yard will be insured.

As heretofore stated the illustration of the various component mechanisms is more or less diagrammatic because the use of standard apparatus is contemplated. The main inventive idea is the use of a relatively high compact bin structure and the use in combination therewith of a transferable reclaimer and a tranferable bedding conveyer.

To secure the best results, particularly in severe climates, careful attention should be paid to the sequence of bedding and reclaiming operations, to the end that the ratio of exposed surface to volume stored shall be minimized. The distance of transfers of conveyers and so forth can be similarly minimized, thus economizing time and power.

In general, when the plant is first put into action a series of adjacent bins should first be bedded to form a solid mass or pile subdivided by the heated bin walls. Then the bedding and reclaiming operations should proceed concurrently, the bins being taken in sequence and bedding operations following the reclaiming operation. In this way it is possible to insure that the ore remains in unitary masses of large size, there being one mass or at most two at any time.

For example assume seven bins arranged in order: $a, b, c, d, e, f, g$, and that $a, b, c$ and $d$ are full. The best procedure is to bed $e, f$ and $g$ in order and concurrently reclaim in the order $a, b, c$, etc. When $g$ is full, clean up any partially reclaimed bin (say $c$) and exchange ends reclaiming in the order $g, f, e$, etc., and bedding in the order $c, b, a$. When $a$ is full change ends as before. This keeps the stored ore in one large mass and minimizes heat losses. The middle bin $d$, however, will be reclaimed only at long intervals.

To avoid this the bins may be taken in strict sequence, $a, b, c, d, e, f, g, a, b, c$, etc., the bedding operation following the reclaiming operation. In this case there will be one mass part of the time and two the remainder, but never more than two.

What we claim is:—

1. That method of conserving heat in the storage of ores in a series of parallel juxtaposed bins, which consists in bedding a series of adjacent bins less than the whole number of bins; thereafter bedding the empty bin adjacent one end of said series and simultaneously reclaiming ore from the full bin at the opposite end of said series, and continuing these bedding and reclaiming operations at opposite ends of the series of bedding bins, the transfer of such operations from bin to bin proceeding in like directions at opposite ends of said series of bedded bins.

2. That method of conserving heat in the storage of ores in a series of parallel juxtaposed bins, which consists in bedding a series of adjacent bins less than the whole number of bins; thereafter bedding the empty bins adjacent one end of said series and simultaneously reclaiming ore from the full bin at the opposite end of said series, and continuing these bedding and reclaiming operations at opposite ends of the series of bedded bins, the transfer of such operations from bin to bin proceeding in like directions at opposite ends of said series of bedded bins until an end bin has been bedded; and then interchanging the bedding and reclaiming means and reversing the direction of transfer from bin to bin.

3. That method of storing and averaging ores and minimizing heat losses therefrom during storage, which consists in bedding a series of laterally confined, immediately laterally juxtaposed piles each made up of longitudinal strata; thereafter bedding successive juxtaposed piles in a similar manner at one end of said series of piles, and simultaneously reclaiming ore from the pile at the opposite end of the series by a digging action carried out over the entire exposed end of the pile, and repeating these bedding and reclaiming operations at opposite ends of said series of piles.

4. That method of storing and averaging materials which consists in depositing them in a longitudinally stratified laterally confined pile and reclaiming them by a digging operation performed over the exposed end of the pile, the digging mechanism being inclined at approximately the angle of repose of the material, whereby the reclaimed material is a substantially uniform average of the pile contents.

5. The combination of a plurality of parallel bins; an excavator adapted to enter said bins; and a transfer device adapted to position said excavator to enter any chosen bin.

6. The combination of a plurality of parallel bins; an excavator adapted to enter said bins; a conveyer adapted to follow said excavator into a bin and convey material from the excavator out of the bin; and a transfer mechanism adapted to position said excavator and conveyer to enter any bin.

7. The combination of a plurality of parallel bins; an excavator adapted to enter said bins; a conveyer adapted to follow said excavator into a bin and to convey material from the excavator out of the bin; a transfer mechanism adapted to position said excavator and conveyer to enter any bin; and propelling mechanism for said transfer mechanism, mounted on said excavator and conveyer.

8. The combination of a plurality of elongated parallel bins; raking devices, one for each bin operative near the top of the bin, and guided to travel the length of the bin; an excavator adapted to enter said bins, and to operate upon material in said bins below said raking devices; a transfer device adapted to position said excavator to enter any chosen bin; and means for connecting said excavator with the raking device in any bin to cause the raking device and the excavator to operate together upon material in said bin.

9. The combination of a plurality of elongated parallel bins, raking devices, one for each bin operative near the top of the bin and guided to travel the length of the bin; an excavator adapted to enter said bins and to operate upon material in said bins below said raking devices; a conveyer adapted to follow said excavator into said bins and to convey material back therefrom; a tripper for said conveyer adapted to discharge material therefrom and movable longitudinally with reference to the conveyer; a transfer device adapted to position said excavator to enter any chosen bin; means for connecting said excavator with the raking device in any bin to cause the two to work together upon material in said bin; and releasable means to hold said tripper in a fixed position as the conveyer moves into the bin.

10. The combination of a plurality of elongated parallel bins; an excavator adapted to enter said bins; a conveyer adapted to follow said excavator into a bin and to convey material back from the excavator and out of the bin; a tripper for said conveyer adapted to discharge material therefrom and movable longitudinally with reference to the conveyer; a transfer device adapted to position said excavator to enter any chosen bin; and releasable means for holding said tripper in a fixed position as the conveyer moves into the bin.

11. A plant for storing and averaging materials comprising in combination a plurality of parallel elongated bins; a bedding conveyer extending in the direction of the length of the bins and adjustable laterally to position it over any bin; a discharge mechanism for the bedding conveyer operative at any point throughout the length of the bins; means for traversing said discharge mechanism back and forth; an excavator independent of said bedding conveyer and adapted to enter the bins to reclaim material therefrom; and a transfer mechanism adapted to position said excavator to enter any chosen bin.

12. A plant for storing and averaging materials comprising in combination a plurality of parallel elongated bins; a bedding conveyer extending in the direction of the length of the bins, and adjustable laterally to position it over any bin; a discharge mechanism for the bedding conveyer operative at any point in the length of the bins; means for traversing said discharge mechanism back and forth; an excavator adapted to enter any of the bins to reclaim material therefrom; raking devices, one guided in each bin to operate above the level reached by the excavator; a transfer mechanism adapted to position said excavator to enter any chosen bin; and means for connecting said excavator with any of said raking devices to cause the two to operate together.

13. A plant for storing and averaging materials comprising in combination a plurality of parallel elongated bins; a bedding conveyer extending in the direction of the length of the bins, and adjustable laterally to position it over any bin; a discharge mechanism for the bedding conveyer operative at any point on the length of the bins; means for traversing said discharge mechanism back and forth; an excavator adapted to enter any of the bins to reclaim material therefrom; raking devices, one guided in each bin to operate above the level reached by the excavator; a transfer mechanism adapted to position said excavator to enter any chosen bin; means for connecting said excavator with any of said raking devices to cause the two to operate together; propelling means associated with said excavator and traveling therewith; and releasable connections between said propelling means and said transfer mechanism whereby said propelling means may propel said transfer mechanism.

14. A plant for storing and averaging materials comprising in combination, a plurality of parallel elongated bins; a bedding conveyer extending in the direction of the length of the bins and adjustable laterally to position it over any bin; a discharge mechanism for the bedding conveyer operative at any point throughout the length of the bins; means for traversing said discharge mechanism back and forth; an excavator independent of said bedding conveyer and adapted to enter the bins to reclaim material therefrom; a conveyer adapted to follow said excavator into a bin and to convey material back from the excavator and out of the bin; and a transfer device adapted to position said excavator and conveyer to enter any chosen bin.

15. A plant for storing and averaging materials comprising in combination, a plurality of parallel elongated bins; a bedding conveyer extending in the direction of the length of the bins and adjustable laterally to position it over any bin; a discharge mechanism for the bedding conveyer operative at any point throughout the length of the bins; means for traversing said discharge mechanism back and forth; an excavator adapted to enter the bins to reclaim material therefrom; a conveyer adapted to follow said excavator into a bin and to convey material back from the excavator and out of the bin; a transfer device adapted to position said excavator and conveyer to enter any chosen bin; a tripper for the last named conveyer, movable relatively to the conveyer in the direction of the length of the conveyer; and means for fixing the tripper in position to cause the conveyer to discharge at a fixed point while the conveyer works past the same as it follows the excavator.

16. An ore storage plant comprising a plurality of parallel adjacent bins separated by hollow walls; heating means in said walls; and means for filling and emptying said bins.

17. An ore storage plant comprising a plurality of parallel adjacent bins separated by hollow walls; heating means in said walls;

means for depositing material in said bins in longitudinally stratified piles; and reclaiming means independent of said material depositing means and adapted to enter said bins at an end thereof, said reclaiming means including a digging mechanism inclined at approximately the angle of repose of said material and adapted to act over substantially the entire exposed end of the pile of material in the bin.

18. An ore storage plant comprising a plurality of parallel adjacent bins separated by hollow walls; heating means in said walls; means for depositing material in said bins in longitudinally stratified piles; reclaiming means independent of said material depositing means and adapted to enter said bins at an end thereof, said reclaiming means, including a digging mechanism inclined at approximately the angle of repose of said material and adapted to act over substantially the entire exposed end of the pile of material in the bin; and a conveyer adapted to receive material from said reclaiming means and convey it out of the bin.

19. The combination with a bin comprising parallel lateral confining walls of a reclaiming machine adapted to excavate material over the entire width between said walls and comprising an overhanging bucket excavator, the angle of over-hang approximating the angle of repose of material stored in said bin; and means for propelling said reclaiming device lengthwise through said bin.

20. The combination with a bin comprising parallel lateral confining walls of a reclaiming machine adapted to excavate material over the entire width between said walls and comprising an overhanging bucket excavator, the angle of over-hang approximating the angle of repose of material stored in said bin; means for propelling said reclaiming device lengthwise through said bin; and a power driven rake structure adapted to be connected with said reclaiming mechanism to be propelled thereby, and adapted to operate upon material stored in said bin above the level reached by said bucket.

In testimony whereof we have signed our names to this specification.

DAVID COLE.
JULIUS BERGMAN.